United States Patent [19]
Ashley

[11] Patent Number: 5,175,442
[45] Date of Patent: Dec. 29, 1992

[54] SIX-PHASE POWER LINE GEOMETRY FOR REDUCED ELECTRIC AND MAGNETIC FIELDS

[76] Inventor: James R. Ashley, 2523 Lake Ellen La., Tampa, Hillsborough County, Fla. 33601

[21] Appl. No.: 594,061

[22] Filed: Oct. 5, 1990

[51] Int. Cl.$^5$ .............................................. H02G 7/20
[52] U.S. Cl. ........................................ 307/91; 307/17; 307/147; 174/45 R
[58] Field of Search ................................. 307/11–14, 307/17, 42, 326, 89–91, 147, 148; 174/32–34, 37–39, 40 R, 45 R; 333/12

[56] References Cited

U.S. PATENT DOCUMENTS

| D. 197,648 | 3/1964 | Dreyfuss | D26/12 |
|---|---|---|---|
| 3,249,773 | 5/1966 | Barthold | 307/147 |
| 3,711,760 | 1/1973 | Kaiser | 336/5 X |
| 4,455,522 | 6/1984 | Lipo | 318/809 |
| 5,070,441 | 12/1991 | Ashley | 363/154 |

OTHER PUBLICATIONS

Fitzgerold, Karen, ed. "Electromagnetic Fields: the jury's still out", IEEE Spectrum, Aug. 1990, pp. 22–35.
Barthold, L. O. and H. C. Barnes, "High Phase Order Power Transmission", Electra, No. 24, 1973, pp. 139–153.
Stewart, James R. et al., "HPO Line Practical for limited R/W", Transmission and Distribution, Oct. 1985, pp. 32–36.

Primary Examiner—A. D. Pellinen
Assistant Examiner—David Osborn
Attorney, Agent, or Firm—David Kiewit

[57] ABSTRACT

A six-phase power line configuration reduces the measured intensity of electric and magnetic fields that are associated with transmitting AC electric power. An open-wire configuration is taught that is compatible with transmission on power line right-of-ways, and that can be made by converting existing three-phase dual circuit power lines.

5 Claims, 4 Drawing Sheets

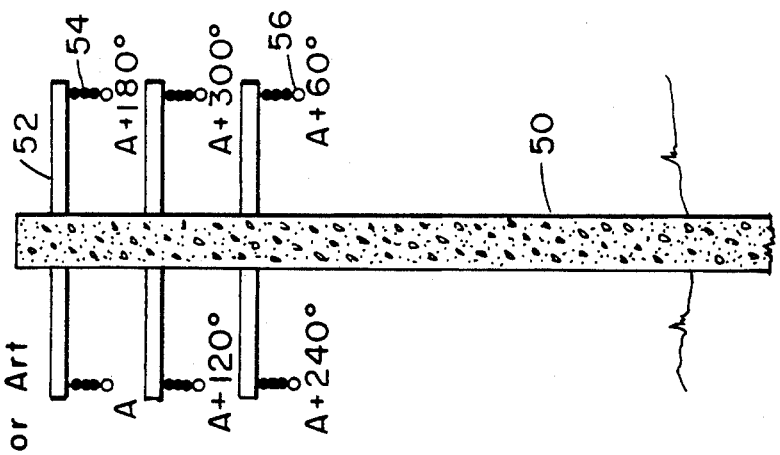
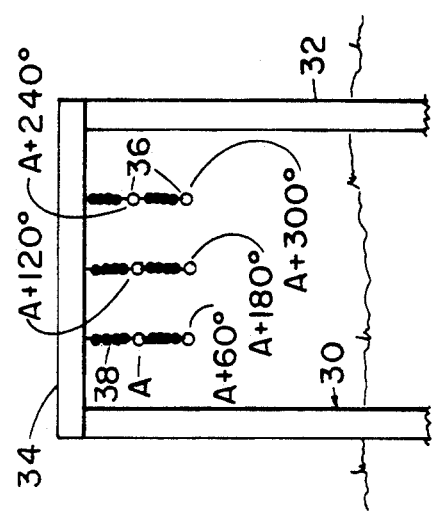
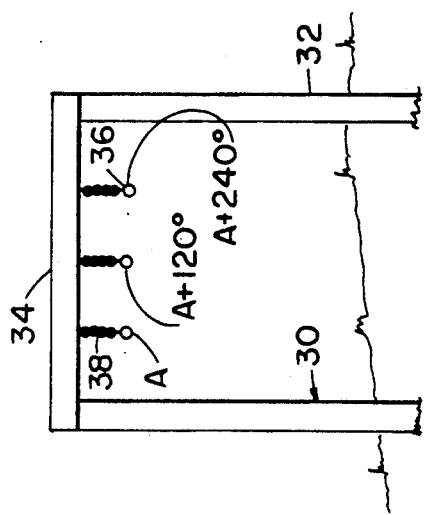

SIX-PHASE POWER LINE GEOMETRY FOR REDUCED ELECTRIC AND MAGNETIC FIELDS

BACKGROUND OF THE INVENTION

Electrical power is distributed from central generating plants to homes, offices, and factories as three phase alternating current. It has long been realized that the choice of AC, rather than DC, allows the use of transformers that permit power to be distributed at higher voltages than the voltage at which it is ultimately used. This practice reduces the current in the distribution system and thereby maximizes distribution efficiency by minimizing losses. To improve efficiency, and to make high starting torque AC motors simpler to engineer, the power transmission system is three phase.

In recent years there has been an increasing public concern about possible biological effects of the low frequency electrical and magnetic fields associated with the distribution and use of electrical power. One can find, for example, a conjectural review of possible phenomenological bases for such effects as well as a discussion of a number of recent epidemological studies in an article by Karen Fitzgerald, et. al., in the August, 1990 issue of IEEE Spectrum (ISSN 0018-9235). Although the evidence in this area is far from being unequivocally persuasive, the level of public concern has led to litigation aimed at preventing the construction of transmission powerlines. For example, the State of Florida, in Chapter 17-274 of the Florida Administrative Code, has a guideline limiting both electric field strength and magnetic flux density at the edge of right of way for new powerlines. These two quantities are measured in accordance with ANSI/IEEE 644-1987 *Standard Procedures for Measurement of Power Frequency Electric and Magnetic Fields from AC Power Lines.*

In discussing public health issues related to power lines, it is convenient to consider three classes of powerlines:

1) Urban distribution lines running from a substation to distribution transformers located near the point of use, and commonly operated at 10 to 50 kV.

2) Urban transmission lines that supply power to the substations, that are usually not isolated on rights of way, and that are commonly operated at 69 to 230 kV.

3) Rural transmission lines that are on rights of way and that are commonly operated at voltages above 230 kV.

Although much of the most recent public outcry has been directed at the third category of power distribution lines listed above, the 10-50 kV category may be more significant because of the vastly greater number of people exposed. Distribution lines in the 10-50 kV category, if mounted on poles, can give rise to measured electrical fields of as much as 20 V/m, and magnetic fields as high as 1.3 micro-tesla when measured on the ground below the lines.

The issue of fringing fields form 10-50 kV powerlines has a well known solution—underground utilities. Both theory and measurements show that placing all three phase conductors in an underground common conduit provides nearly perfect magnetic and electrostatic shielding. There are also aesthetic advantages to underground utilities, which has led to their widespread use in new construction. A major question in the controversy over possible health risks from fringing fields is whether to rebuild existing distribution lines and to literally bury the supposed problem. A method of reducing or eliminating fringing fields while using existing pole-supported open wires could provide an economically attractive alternative method of resolving the problem.

In many larger cities of the United States, the second level of electrical distribution is served by 69 kV to 138 kV lines on wooden or steel poles that are located along streets rather than being on dedicated rights of way. It is common to measure electrical fields of over 100 V/M in the front yards of homes that are adjacent to such lines. The magnetic fields associated with these lines, however, are usually lower than those from the lower voltage 10-50 kV distribution lines that commonly mounted below the 69-138 kV circuit on the same poles.

The intermediate distribution system of category 2 may pose a serious potential problem. Theoretically, burying the three conductors in a common steel or plastic conduit, which is commonly used for the 10-25 kV lines, will work at any voltage level, and will eliminate fringing electrical fields. If the same wiring geometry is used for these lines as is employed for the 10-25 kV lines, burial will also practically eliminate fringing magnetic fields above ground. Putting all three conductors in a common steel conduit unfortunately poses other problems, partly because of the difficulty of providing adequate phase-to-phase dielectric insulation at the higher voltages. In addition to the insulation question, the added line capacitance associated with this construction could lead to transmission inefficiencies because of leading power factor. If, on the other hand, the three phase conductors are buried in separate conduits and the common neutral wye connection is used for the transformers at either end of the line, fringing magnetic fields are not eliminated. In fact, since people walking above the buried line are closer than they would be to a comparable overhead power line, exposure to magnetic fringing fields could be more severe for an underground line.

At larger substations, power from generating plants is supplied at 230 kV or higher. These lines are usually constructed on dedicated rights of way that are typically 60 m (about 200 ft) wide. For remote power plants and interconnection with other utilities, the powerlines are operated at 345 kV, 500 kV, and 765 kV. These high capacity powerlines have large steel towers, long insulators, and bundles of conductors. Fortunately, the electrical and magnetic fields from these lines diminish rapidly in intensity the further one goes away from the conductors and the number of people who live within 200 m of these power lines is small; thus, it is not as significant a potential public health risk as the other two categories.

One can show from basic physical theory that the strength of electrical and magnetic fields decreases dramatically with distance from the two parallel conductors that are commonly used for single phase power distribution. (Magnetic intensity falls inversely with the square of distance). Near the conductors, the electric and magnetic fields are intense, but once one moves further away from the line than 5 times the conductor-to-conductor spacing, the fields are weak. Although fringing fields can be reduced by close conductor spacing, this approach is limited by other factors, such as the dielectric strength required to prevent arcing between the phase conductors.

The foregoing discussion is directed toward transmission lines made of several parallel conductors. Another widely used transmission line design is "coaxial", which is widely used when shielding is important. The adaptation of coaxial lines to the field-free transmission of electric power has been discussed in my co-pending application (U.S. Ser. No. 07/578,215)

Coaxial transmission lines have a higher capacitance per unit length than do parallel lines, and will hence have a higher leading power factor. In a 10–50 kV distribution line this may not be a problem, as both fluorescent lights and induction motors for air conditioning operate with a lagging power factor that the coaxial line may offset.

A different assignment of conductor phase angles for six-phase transmission was disclosed by Y. Onogi, F. Isaka, A. Chiba, and Y. Okumoto, in their article "A Method of Suppressing Fault Currents and Improving the Ground Level Electric Field in a Novel Six-Phase Power Transmission System," which appeared in the IEEE Transactions on Power Apparatus and Systems, PAS-102, p 870–880, 1983. In the teaching of Onogi et al the phase angle difference between the three vertically disposed conductors on each side of a support tower is 120 degrees. The phase angle difference between horizontally disposed pairs of conductors is 180 degrees. Onogi, et. al., illustrate the significant reduction in ground level electric field as compared to the phase angles taught by Stewart, et. al. The magnetic field measured 1 m above ground is also lower for the Onogi, et. al., phase angle choice when compared to the Stewart, et. al, phase angle choice.

At higher voltages the higher capacitance of coaxial lines becomes a serious disadvantage. In general, the leading current per phase is given by $V^2/C$, where V is the phase voltage and C is the capacitance. Increases in line voltage may be accompanied by a decrease in capacitance, caused by an increased thickness of dielectric, but this contribution to the reactance will be dominated by the second power of the voltage increase—i.e. the leading current per phase will increase proportionally to about the 1.8 power of voltage. At 230 kV and above, both the cost and the excess capacitance of a coaxial transmission line rule it out for long distance powerlines.

Another relevant area of technical background to the present invention is the use of six phase transmission to increase the amount of electrical power that can be transmitted along a given width right of way. The basic idea behind this work was to replace an existing dual circuit three phase powerline with the same phase to ground voltage six phase powerline and increase power transmission by 73%. Initial work in this field, which was reported by James R. Stewart, et. al, in the October 1985 *Transmission & Distribution* magazine (ISSN 0041-1280), arranged the six phase conductors symmetrically. A cross section of this power line was a hexagon, with one conductor at each vertex and with the phase advancing by 60 degrees as one went around the hexagon from conductor to conductor. The electric field and magnetic flux density on the ground under and near the six phase powerline are comparable to those from the replaced three phase powerline. Although this arrangement did demonstrate that six phase transmission offered a way to increase the amount of electrical power that could be sent down a given right of way, it involved an expensive construction technique which is suited to rebuilding existing powerlines located on narrow dedicated rights of way. This prior art did not show a significant reduction to the fringing electric and magnetic fields.

This defines the problem to be solved by my invention: Significantly reduce both fringing magnetic fields and electric fields of an open wire high voltage multi-phase power transmission line by compatible means that are adaptable to rebuilding existing lines in urban areas as well as rural areas.

OBJECTS OF THE INVENTION

It is an object of the invention to provide a method and apparatus for multi-phase, open wire alternating current electrical power transmission that decreases electrical and magnetic fields at both the fundamental and higher harmonic frequencies when these fields are measured one meter above the surface of the earth under and adjacent to the power line.

It is a further object of the invention to provide a method and apparatus for multi-phase electrical power transmission that substantially reduces whatever public health risks may be attributed to exposure to fringing electrical and magnetic fields associated with prior art transmission apparatus.

It is a further object of the invention to provide a means of reducing or eliminating whatever potential public health risks are attributed to fringing magnetic fields, this method being compatible with existing installed transmission equipment and facilities and that is thereby more economical than other known expedients, such as burying urban electrical distribution cabling in conduits.

DESCRIPTION OF THE DRAWING

FIGS. 1*a-f* of the drawing presents cross-sectional views of the orientation and phase relations of conductors in prior art multi-phase AC power lines.

FIG. 1*a* illustrates a conventional three phase line.

FIG. 1*b* shows dual three phase lines supported on common poles.

FIG. 1*c* shows a six phase line designed to maximize the amount of power that can be transmitted on an existing right of way.

FIG. 1*d* shows a conventional three phase powerline suitable for a wide right of way.

FIG. 1*e* illustrates the prior art of converting the phase powerline of FIG. 1*d* to six phase using minimum length insulators between pre-existing conductors and added conductors.

FIG. 1*f* shows a cross-sectional configuration of a six-phase open wire power transmission line taught by Onogi et al.

DETAILED DESCRIPTION

Figure 1A:
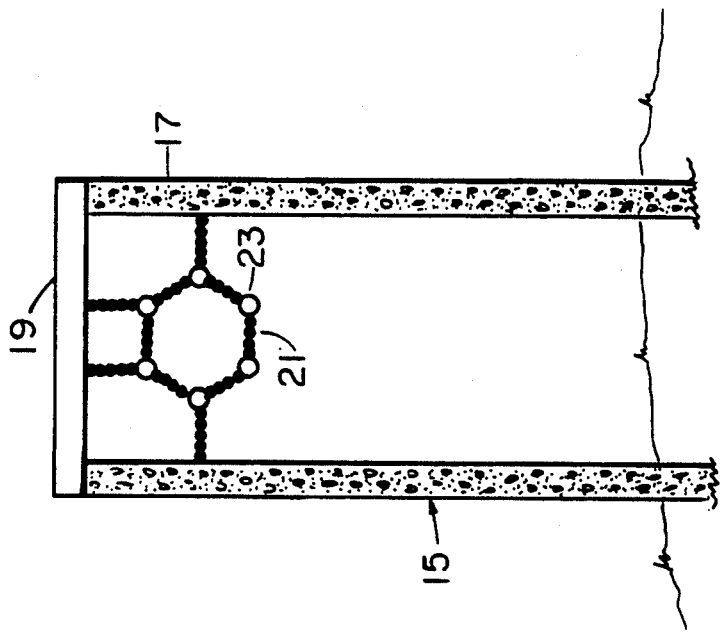
Figure 1B:
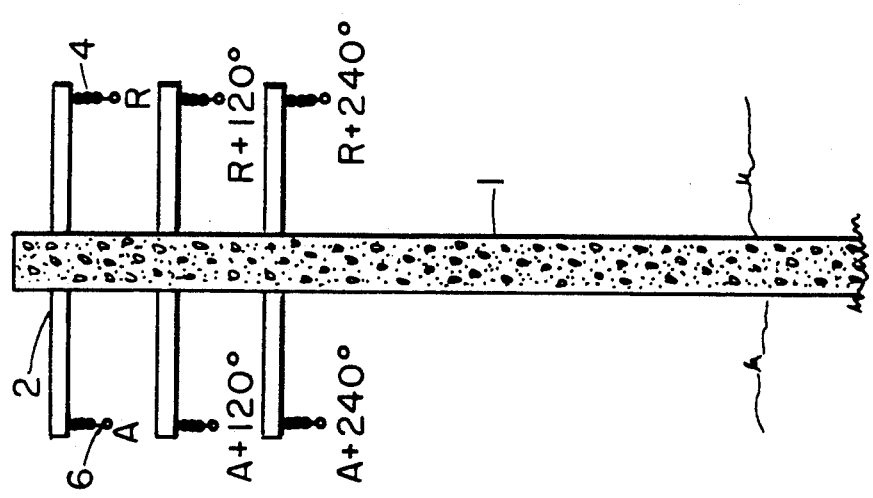

Several prior art wiring configuration systems are illustrated in FIG. 1 of the drawing. FIG. 1*a* shows a cross section of a conventional pole- or tower-supported, open wire, three phase, transmission or distribution powerline, where a pole 1, with arms 2 and insulators 4 is used to support the three conductors generally shown as 6. For convenience, each of these conductors is labeled to indicate the phase angle of the applied line to ground voltage. For the three phase circuit shown in FIG. 1a, the conductors are labeled A, A+120°, and A+240°. FIG. 1b illustrates a dual circuit three phase powerline, more commonly found in rural areas, in which pole 1, arms 2 and insulators 4 are used to support six conductors 6 carrying currents with phases A, A+120°, A+240°, R, R+120°, and R+240° where there is no necessary fixed phase relation between the two sets of conductors; but, where the conductor phase R is usually chosen to be identical to either A, A+120°, or A+240°.

Figure 1C:
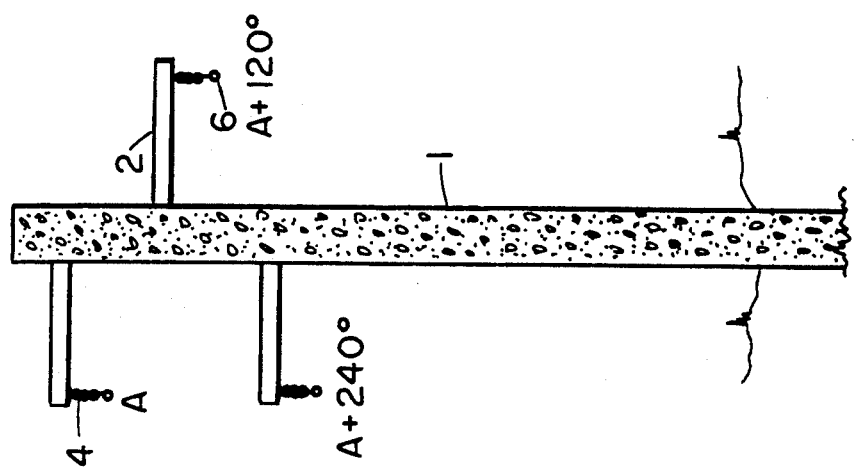

FIG. 1c illustrates a six phase powerline, as described by James R. Stewart, et. al., in the October 1985 *Transmission & Distribution* magazine (ISSN 0041-1280), in which a portal tower 15, consisting of poles 17 and crossmember 19 and insulators 21 support six conductors 23 carrying currents with phases A, A+60°, A+120°, A+180°, A+240° and A+300°. The location of the phase conductors is intended to be closely at the vertices of a regular hexagon. In symmetrical six phase systems the phase to phase voltage is equal to the phase to neutral (ground) voltage; whereas in three phase systems the phase to phase voltage is equal to the square root of three times phase to neutral voltage. Hence, the conductors can be placed closer together for the six phase configuration shown in FIG. 1c than for a three phase system that transmits the same power.

The prior art teaching of Stewart, et. al., can also be applied to the conversion of conventional portal mounted three phase transmission line (shown in FIG. 1d of the drawing) to a six phase configuration. In FIG. 1d a portal tower 30, consisting of poles 32 and crossmember 34, supports conductors 36 by means of insulators 38. The phases of the three conductors 36 are shown in the same format as used in prior figures. The conversion of this three phase powerline to a six phase powerline is shown in FIG. 1e, which uses the same portal tower 30 and insulators 38, along with additional insulators 39 to support conductors 36 that carry currents that have phases as indicated in the figure. Insulators 38 and 39 are of equal length. Note that since the conversion of the three phase powerline of FIG. 1d to the six phase configuration of FIG. 1e requires the weight of the additional conductors and insulators to be supported; and, since the clearance at the midpoint between portal towers is reduced by the length of the additional insulators 39, this conversion process might require additional towers (not shown) to be placed at intervals between the towers of the pre-existing three phase powerline. Said additional towers (not shown) will reduce the weight supported by the pre-existing towers to the original value supported and, since the span between towers is reduced to approximately half of the pre-existing value, reduce the sag between towers and sufficiently increase the clearance of the lowest conductor to the surface of the earth at the mid-point between towers.

FIG. 1f illustrates a six-phase power line geometry described by Y. Onogi, et. al, in which pole 50, arms 52, and insulators 54 support the six conductors 56, one per phase, energized with conductor-to-ground voltages having the relative electrical phase angles A, A+60°, A+120°, A+180°, A+240°, and A+300°. For the usual case of supplying power to a nearly balanced, high power factor load, the conductor currents will have the same relative electrical phase angles. The phase angle shown in FIG. 1f are similar in phase difference vertically to a dual circuit three-phase power line which might use the same support pole, arms, and insulators; i.e., the phase angle difference between any two vertically disposed conductors is 120°.

Figure 2B:
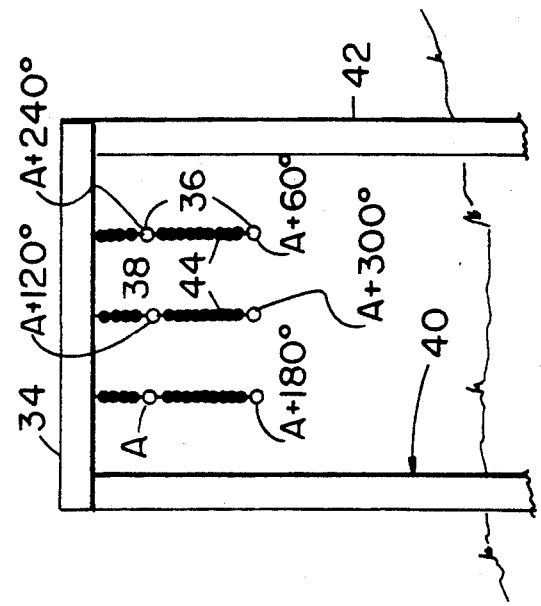
FIG. 2*b* teaches the conversion of the three phase powerline of FIG. 1*d* to a six phase power line engineered for minimal fringing electric and magnetic fields near the ground but off of the right of way.
Figure 2A:
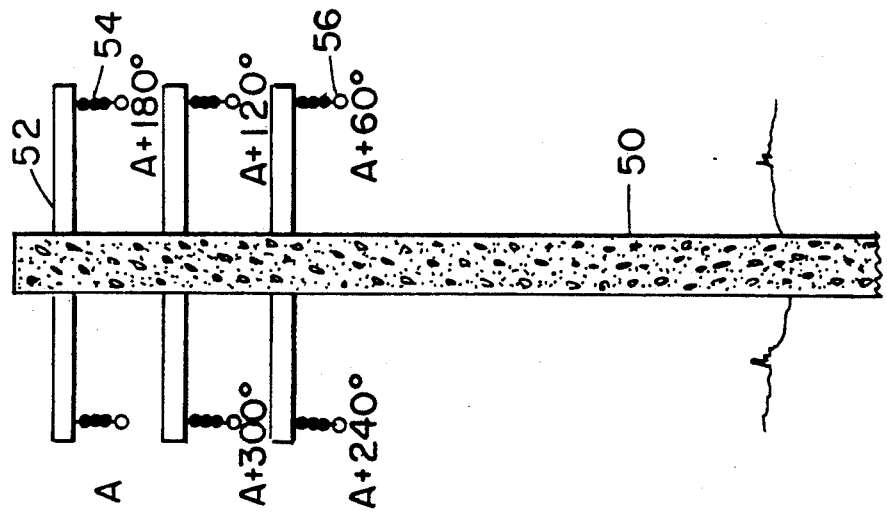
FIG. 2*a* of the drawing shows one possible cross-sectional configuration of six phase open wire power transmission lines according to the present invention.

Turning now to FIG. 2 of the drawing, there are shown two different cross sections of six phase power lines that are configured to reduce fringing electrical and magnetic fields by recourse to the disclosed expedient of pairing each conductor with an anti-phase conductor (i.e. pairs of adjacent conductors carry currents that differ in phase by 180°). FIGS. 1f and 2a, show two six phase power lines in which poles 50, arms 52 and insulators 54 support the six phase conductors 56 carrying currents with phases A, A+60°, A+120°, A+180°, A+240° and A+300°.

FIG. 2b shows a six phase powerline according to the present teaching that consists of conductors 36 supported by portal tower 40, which is comprised of poles 42 and crossmember 34, and by insulators 38 and 44.

Note that Stewart's earlier six phase wiring arrangement as shown in FIG. 1c and 1e was chosen to reduce the voltages between adjacent conductors, and thereby to allow closer conductor-to-conductor spacing. Since Onogi's teaching, as illustrated in FIG. 1f, and the present teaching, as illustrated in FIGS. 2a and 2b, does not minimize the voltages between adjacent conductors, greater dielectric protection is required for the present system than for the comparable case discussed by Stewart. For example, the differences in voltages between adjacent conductors require that the insulators 44 of FIG. 2b be twice as long as the comparable insulator 39 of FIG. 1e. Hence, the poles 42 of the portal tower 40 of FIG. 2b also need to be longer than the poles 32 of portal tower 30 in FIG. 1e in order to maintain an acceptable air gap between the lower set of conductors and the surface of the earth.

An object underneath the powerlines of FIGS. 1f and 2a nearly equidistant from conductors with instantaneously opposing voltages. For example, if the phase A represents a maximum instantaneous positive value, the phase A+180° will be at a maximum instantaneous negative value. Hence, the electric flux from these two conductors, as measured at the remote object, will be opposite in direction, but nearly equal in absolute value. The net result will be a near cancellation of potential gradient under the powerline.

Similar arguments indicate that cancellation of the magnetic flux density is also obtained by the disclosed wiring arrangement, because an object under the six phase power lines of FIG. 2a is nearly equidistant from paired conductors in which nearly equal current flow in opposite directions. Computer simulation studies for the six phase powerlines of FIG. 2 have shown that the disclosed arrangement reduces the magnetic flux density measured 1 meter above the ground under and adjacent to the powerlines to less than half of the value found for a comparable prior art three phase or six phase powerline.

The for argument indicates that the conductor phasing shown in FIG. 2b may be used to minimize human exposure to both the electrical and the magnetic fields associated with power distribution and transmission. A person in a house located on a lot abutting a right of way, for example, would be nearly equidistant from antiphased conductor pairs that will act to cancel both the electric and magnetic fields.

Either of the two conductor phasings taught in FIGS. 1f and 2a of the drawing can be used to convert the rural two circuit three phase powerline, shown in FIG. 1b, to six phase service. In this case the exact choice between the two configurations shown in FIGS. 1f and 2a would be made by using the known electrostatic and static magnetic calculational methods to see which of the two configurations yields the most desirable pattern for the fringing fields near the ground for the pre-existing set of arm-to-arm, arm-to-pole, and lowest-arm to-ground spacings encountered for a given powerline.

Figure 3:
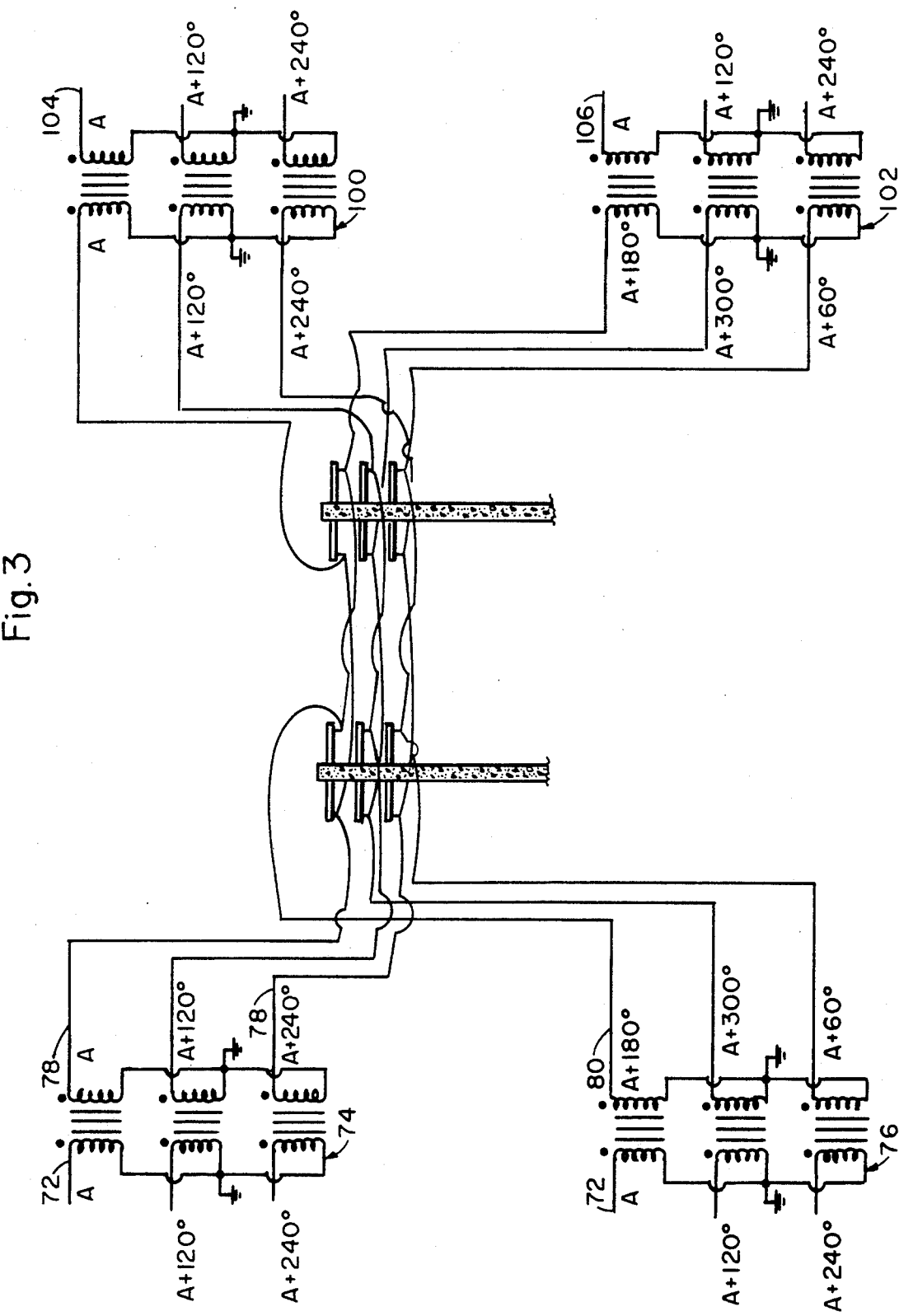
FIG. 3 of the drawing further illustrates a six phase power transmission line in combination with transformers at either end of the powerline.

A method of connecting sources and loads to a six phase line is shown in FIG. 3 of the drawings, where the power flow is arbitrarily chosen to be from left to right. Power from a three phase source 70 (not shown), supplying electrical power over wires 72 at three phases A, A+120°, and A+240° is connected to two three phase transformers 74 and 76. The secondary of transformer 74 is connected so as to provide a three phase output, over conductors 78, having the same phases as the source. The secondaries of transformer 76 are connected so as to provide a three phase output over conductors 80, in which each output phase differs in time by one half cycle from the input (i.e. the transformer 76 provides outputs with phases of A+180°, A+300° and $A+420°=A+60°$).

The conductors 78 and 80 may be supported by poles 90 and insulators 95 and used to form a six phase line having the cross-sectional configuration shown in FIG. 2b of the drawing.

At the output end of the distribution system, the conductor sets 78 and 80 are used to feed two output transformers 100 and 102. The conductor set 78, which carries phases A, A+120°, and A+240°, feeds transformer 100 and leads to an output on lines 104 that have the same phases. The conductors 80 feed transformer 102, which, like transformer 76 at the source end of the line, is connected so as to shift the phase of its output by ½ cycle. The output of transformer 102, delivered on conductors 106, having undergone two phase shifts of one-half cycle, is also a three phase current having original phases A, A+120°, and A+240°.

In the arrangement of FIG. 3, the load currents supplied by transformer 100 may not exactly equal the load currents supplied by transformer 102; thus, the fringing magnetic field reduction of this teaching will be less than for the case of equal load currents supplied by transformers 100 and 102. The arrangement of FIG. 3 does not depend on equality of load currents to significantly reduce the fringing electric field one meter above the surface of the ground below and adjacent to the disclosed six-phase powerline.

It should be noted that the arrangement shown in FIG. 3 is symmetrical, and that the terms "source end" and "output end" of the lines are arbitrary and may be interchanged.

Although the present invention has been described with respect to several embodiments and minor modifications thereof, many alterations and modifications may be made without departing from the invention. Accordingly, it is intended that all such alterations and modifications be considered as within the spirit and scope of the invention as defined in the appended claims.

I claim:

1. Apparatus for transmitting electric power comprising six conductors, means to energize each said conductor at a different electrical phase angle, each said phase angle differing from another of said phase angles by sixty degrees, dielectric means to electrically isolate each of said six conductors from others of said six conductors and from ground, wherein each of said six conductors has as a nearest neighboring conductor one of the two of said six conductors differing in phase by 60 degrees from said each of said six conductors, and wherein said each of said six conductors is closer to that other one of said six conductors that is energized at a phase angle differing by 180° degrees from said phase angle of said each of said six conductors than said each of said six conductors is from any of said six conductors having a phase angle differing from the phase angle of said each of said six conductors by 120 degrees.

2. A method of reducing electric and magnetic fields measured on the surface of the earth proximate to an overhead three-phase AC electric power line wherein each of three pre-existing phase conductors of said power line is mounted on an arm that is held above the surface of the earth by a generally vertical pole and wherein two of said three phase conductors are mounted on a predetermined side of said pole and the third of said three phase conductors is mounted on the opposite side of said pole, said method comprising the steps of adding three additional conductors wherein the vertical spacing between two of said six conductors is the minimum consistent with dielectric isolation requirements and wherein each said additional conductor is nearer to one of said three pre-existing phase conductors than it is to another of said additional conductors, providing a source of six phase electrical power that energizes each of said additional three conductors at a phase that differs by sixty degrees from the phase of a said pre-existing conductor that is its nearest neighbor, and providing a sink for six phase electric power.

3. The method of claim 2 further comprising the step of energizing said added conductors at a power level that differs from that provided to said pre-existing three phase conductors.

4. A method of claim 2 wherein said sink for six phase electric power comprises a pair of three phase transformers.

5. Apparatus for transmitting electric power comprising six conductors, means to energize each said conductor at a different electrical phase angle, each said phase angle differing from another of said phase angles by sixty degrees, wherein each of said six conductors is vertically separated from a neighboring conductor differing in phase by 180 degrees from said each of said six conductors by a first dielectric means, wherein each of said six conductors has at its nearest neighbor in a horizontal direction another of said six conductors that is energized at a phase angle differing by 120 degrees from said phase angle of said each of said six conductors, and wherein three of said six conductors are separated from a grounded support by a second dielectric means.

* * * * *